Figure 1:
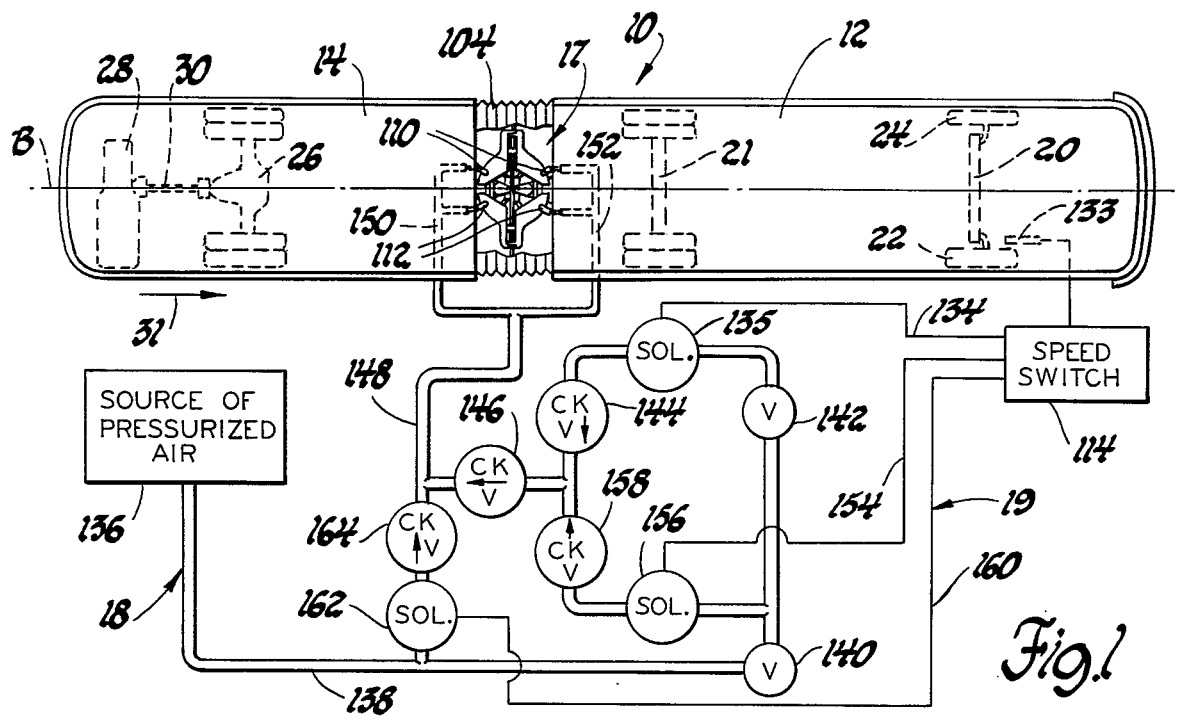

United States Patent [19]

Dawson et al.

[11] Patent Number: 4,482,165
[45] Date of Patent: Nov. 13, 1984

[54] DAMPING SYSTEM FOR ARTICULATED VEHICLE

[75] Inventors: James M. Dawson, Ortonville; David J. Taylor, Pontiac, both of Mich.

[73] Assignee: General Motors Corporation, Detroit, Mich.

[21] Appl. No.: 447,028

[22] Filed: Dec. 6, 1982

[51] Int. Cl.³ .............................................. B62D 53/00
[52] U.S. Cl. ........................................ 280/432; 105/3;
  105/8 R; 105/18; 188/181 R; 280/403;
  280/424; 280/492
[58] Field of Search ............... 280/432, 400, 403, 424,
  280/446 B, 460 R, 492 R; 105/3, 4, 8, 15, 18,
  175; 188/181 R, 181 A; 180/22

[56] References Cited

U.S. PATENT DOCUMENTS

| | | | |
|---|---|---|---|
| 2,099,361 | 11/1937 | Hamilton et al. | 105/175 R |
| 2,116,944 | 5/1938 | Hamilton et al. | 105/175 R |
| 2,134,443 | 10/1938 | Hamilton et al. | 105/175 R |
| 3,393,923 | 7/1968 | Rendessy | 280/432 |
| 3,994,510 | 11/1976 | Howard | 280/432 |
| 4,313,616 | 2/1982 | Howard | 280/446 B |
| 4,405,143 | 9/1983 | Rosenkrands | 280/403 |
| 4,405,145 | 9/1983 | Bergman et al. | 280/432 |
| 4,421,339 | 12/1983 | Hagin | 280/432 X |

Primary Examiner—Joseph F. Peters, Jr.
Assistant Examiner—Mitchell J. Hill
Attorney, Agent, or Firm—Edward J. Biskup

[57] ABSTRACT

A damping system having a fluid-operated friction device located at the hinge connection of an articulated vehicle that provides progressively increased damping to movements about the yaw axis after the speed of the vehicle increases beyond a predetermined speed.

2 Claims, 2 Drawing Figures

U.S. Patent     Nov. 13, 1984     4,482,165

DAMPING SYSTEM FOR ARTICULATED VEHICLE

This invention relates to a damping system for articulated vehicles and more particularly concerns a damping system located at the hinge connection between the two sections of an articulated vehicle and which serves to provide increased damping to movements about a vertical axis at the hinge connection as the speed of the vehicle increases.

As is well known, when the speed of an articulated vehicle increases, road induced yaw vibrations tend to increase as a function of speed and can create erratic relative movements of the two sections of the vehicle about the hinge connection. Accordingly, the present invention is directed to a damping system the purpose of which is to alleviate this problem by providing some damping at the hinge connection when the articulated vehicle attains a speed at which the relative movements tend to become annoying to the vehicle operator and/or the passengers, and afterwards increases the damping at predetermined higher speeds of the vehicle.

More specifically, the damping system according to the present invention is incorporated in an articulated vehicle having a front section and a rear section interconnected by a hinge connection which allows relative angular displacement of the front and rear sections about a vertical axis. The damping system includes a fluid-operated friction device located at the hinge connection for resisting road induced erratic relative movements of the front and rear sections about the vertical axis. In the preferred form, an electric control circuit is provided for causing the friction device to increase its resistance to the aforementioned relative movements in accordance with an increase in the speed of the articulated vehicle after the vehicle attains a predetermined speed. Thus, when the vehicle is traveling at the predetermined speed, the electric control circuit causes pressurized fluid at low pressure to be supplied to the friction device which then provides some resistance to the yaw movements at the hinge connection between the front and rear sections of the vehicle. When the vehicle attains a predetermined higher speed, the electric control system then causes pressurized fluid at an increased pressure to be supplied to the friction device so as to provide increased damping at the hinge connection. Afterwards, when the vehicle reaches a still higher predetermined speed, the friction device is connected to the source of the pressurized air at full available pressure so as to provide maximum damping at the hinge connection without locking the two sections of the vehicle together.

The objects of the present invention are to provide a new and improved damping system including a friction device located at the hinge connection of an articulated vehicle that provides progressively increased damping to movements about the yaw axis after the speed of the vehicle increases beyond a predetermined speed; to provide a new and improved damping system having a friction device located between the two sections of an articulated vehicle that provides a first level of resistance to relative movement of the two sections about the vertical axis after the vehicle attains a predetermined speed and increases the level of resistance to relative movement of the two sections about the vertical axis when the vehicle reaches a speed higher than the predetermined speed; to provide a new and improved damping system for the hinge connection of an articulated vehicle that includes a fluid-operated friction device which is supplied with fluid at a predetermined pressure after the vehicle attains a first predetermined speed and is supplied with fluid at an increased pressure when the vehicle attains a second predetermined speed greater than the first predetermined speed; and to provide a new and improved damping system which progressively increases the resistance to yaw movement of the front and rear sections at the hinge connection of an articulated vehicle as the vehicle attains three relatively high predetermined speeds.

Figure 2:
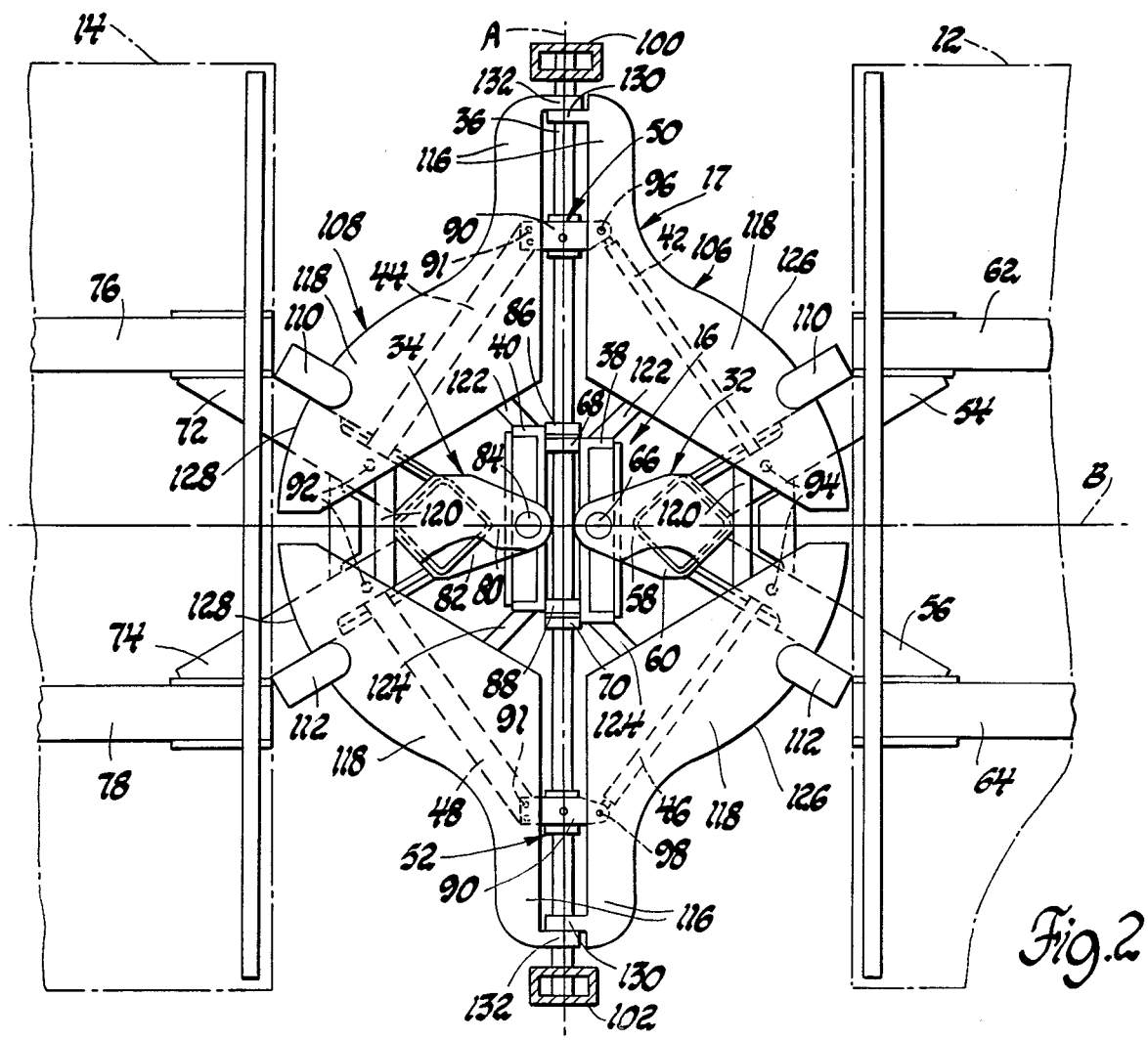

These and other objects and advantages of the present invention will be more apparent from the following detailed description, taken in conjunction with the accompanying drawings, in which:

FIG. 1 is a plan view of the front and rear sections of an articulated bus interconnected by a hinge connection incorporating a damping system made in accordance with the present invention and schematically shows the air and electric circuits which form a part of the invention; and FIG. 2 is an enlarged plan view of the hinge connection and the friction device which is part of the damping system shown in FIG. 1.

Referring now to the drawings and more specifically FIG. 1 thereof, an articulated vehicle or bus 10 is shown that includes a front section 12 and a rear section 14 interconnected by a hinge connection 16 incorporating a friction device 17 which forms a part of a damping system made in accordance with the present invention. The damping system also includes an air system 18 and an electric control circuit 19, and as will be explained more fully hereinafter, the damping system serves to dampen erratic and undesirable relative movements between the front and rear sections 12 and 14 about the yaw axis provided by hinge connection 16 that might occur as a result of road induced vibrations when the bus 10 is traveling in a straight-ahead direction above a predetermined speed.

More specifically, the front section 12 of the bus 10 is provided with nondriven front and center axles 20 and 21, respectively, the former of which rotatably supports laterally spaced dirigible wheels 22 and 24 for allowing the bus 10 to negotiate turns as it is driven along the road. The rear section 14 is provided with a driven rear axle 26 which obtains power from an engine 28 through a suitable drive train which includes a drive shaft 30. Thus, the rear section 14 serves as a power unit for driving the bus 10 in reverse and in the forward direction indicated by the arrow 31. When the bus 10 is moving in the forward direction, the rear section 14 drives the front section 12 through the hinge connection 16 which serves to maintain the two sections of the bus 10 in proper alignment during straight-ahead travel while allowing angular displacement between the two sections 12 and 14 when the bus 10 is in a turn and when traveling over crests and valleys.

As best seen in FIG. 2, the hinge connection 16 generally includes a pair of tongue members 32 and 34, a transversely extending pivot shaft member 36, a pair of trunnion members 38 and 40, a linkage which comprises link members 42, 44, 46, 48, and a pair of slider assemblies 50 and 52 mounted on the pivot shaft member 36 for maintaining the pivot shaft member 36 properly positioned relative to the front and rear sections 12 and 14.

The tongue member 32 comprises a pair of converging beam members 54 and 56 which are fixed at one end to vertically spaced upper and lower plate members 58 and 60 and secured at the other end to longitudinally extending frame members 62 and 64 of the vehicle front section 12. The plate members 58 and 60 straddle the trunnion member 38 which rigidly supports a vertically oriented pivot pin 66, the upper and lower ends of which are journaled in the upper and lower plate members 58 and 60, respectively. The trunnion member 38 also includes a pair of rearwardly projecting ears 68 and 70 which are rotatably mounted on an intermediate portion of the pivot shaft member 36, the center longitudinal axis of which is identified by the letter A and is normally located in a horizontal plane.

The tongue member 34 is substantially identical in construction to the tongue member 32 and also comprises a pair of converging beam members 72 and 74, each of which is secured at one end to the laterally spaced and longitudinally extending frame members 76 and 78 of the vehicle rear section 14. The other ends of the beam members 72 and 74 are fixed to upper and lower plate members 80 and 82, respectively, which in this case straddle the trunnion member 40 which is identical in construction to trunnion member 38. The trunnion member 40 rigidly supports a vertically oriented pivot pin 84, the opposite ends of which are journaled in the upper and lower plate members 80 and 82, and also includes a pair of transversely spaced ears 86 and 88 which, project forwardly and are rotatably mounted on the pivot shaft member 36 adjacent the ears 68 and 70 formed on the trunnion member 38.

The two slider assemblies 50 and 52 of the linkage mechanism are identical in construction. Each assembly 50 and 52 is in the form of a ring member adapted to slide along the pivot shaft member 36 and rigidly supports a two-part bracket member 90 fixedly bolted at 91 to the outboard end of the link member 44 or 48, as the case may be. The link members 44 and 48 are identical in construction and each has the inboard end thereof connected to the tongue member 34 by a pivotal connection 92. Likewise, the link members 42 and 46 are identical in construction and each has the inboard end thereof connected by a spherical connection 94 to the tongue member 32. The outboard end of the link member 42 is connected to a bracket member 90 of the slider assembly 50 by a spherical connection 96, and the outboard end of the link member 46 is connected to the bracket member 90 of the slider assembly 52 by a spherical connection 98.

It should be apparent from the foregoing description that the front and rear sections 12 and 14 are capable of pivoting relative to each other in opposite directions about the vertical center axes of the trunnion pivot pins 66 and 84 and also capable of pivoting about the longitudinal center axis A of the pivot shaft member 36. Accordingly, the hinge connection 16 allows the bus 10 to negotiate turns and travel over crests and valleys in a road surface. In addition, the linkage mechanism which comprises the four link members 42, 44, 46, and 48, and the two slider assemblies 50 and 52, ensures that the longitudinal center axis A of the pivot shaft member 36 is perpendicular to the longitudinal center axis B of the bus 10 (as seen in FIG. 1) when traveling straight-ahead, and always bisects the deflection angle between the front and rear sections 12 and 14 when the bus 10 is in a turn. This is important because the other ends of the pivot shaft member 36 are rigidly connected to the lower portions 100 and 102 of a conventional hoop member (not shown) which supports the bellows 104 between the front and rear sections 12 and 14 of the bus 10. Therefore, by maintaining the pivot shaft member 36 and the hoop member at equal distances from the front and rear sections 12 and 14, the usual accordian folds of the bellows 104 are properly arranged as the bus 10 moves through a turn. The positioning of the pivot shaft member 36 by the linkage mechanism as explained above is also important because it ensures that the vertical center axes of the pivot pins 66 and 84 are located and maintained along the longitudinal center axis B when the bus 10 is traveling in a straight-ahead direction and that when the bus 10 is in a turn, the longitudinal center axis of the rear section 14 that passes through the vertical center axis of the pivot pin 84 and the longitudinal center axis of the front section 12 that passes through the vertical center axis of the pivot pin 84 will intersect at a common point located in a vertical plane passing through the longitudinal center axis of the pivot shaft member 36.

As alluded to hereinbefore, the friction device 17 serves to reduce the relative motions about the yaw axis which may occur at elevated speeds in trained vehicles such as the bus 10. In this regard, it will be noted that the friction device 17 includes a pair of segmentated friction plate members 106 and 108 located at opposite sides of the pivot shaft member 36 and two pair of air-operated brake calipers 110 and 112. Each friction plate member 106 and 108 is supported for pivotal movement by the pivot shaft member 36 and cooperates with one pair of the brake calipers 110 and 112 for damping relative movement of the front and rear sections 12 and 14 of the bus 10 about the vertical center axes of the pivot pins 66 and 84. As seen in FIG. 1 and as will be explained more fully hereinafter, the electric circuit 19, which includes an electronic speed switch 114, serves to vary the pressure of the compressed air supplied by the air system 18 to each pair of the calipers 110 and 112 so as to increase damping as the speed of the bus 10 increases.

As best seen in FIG. 2, when the front and rear sections 12 and 14 of the bus 10 are aligned along the center axis B, the friction plate members 106 and 108 are symmetrical with respect to the longitudinal center axis B of the bus 10. In addition, each friction plate member 106, 108 comprises two segments each of which has the configuration of a boot having a foot portion 116 and a leg portion 118. The adjacent leg portions 118 of the segments of each friction plate member 106, 108 are directly connected to each other by a transversely extending bar 120, while a pair of struts 122 and 124 connect the adjacent leg portions 118 to the associated trunnion member 38, 40, as the case may be, of the hinge connection 16. Also, the outer curved edged 126 of the leg portion 118 of each segment of the friction plate member 106 is located on a circle having its center at the vertical center axis of the pivot pin 66, while the corresponding outer curved surface 128 of the leg portion 118 of each segment of the friction plate member 108 is located on a circle having its center at the vertical center axis of the pivot pin 84.

As aforementioned, the friction plate members 106 and 108 are pivotally supported by the pivot shaft member 36 and, in this regard, it will be noted that the foot portions 116 of the two segments of friction plate member 106 extend laterally outwardly beyond the slide assemblies 50 and 52 and each terminates with an ear 130 which projects rearwardly toward the rear section 14 of bus 10 and serves to pivotally connect the outer ends of the friction plate member 106 to the pivot shaft member 36. Similarly, the foot portions 116 of the two segments of friction plate member 108 also extend laterally outwardly beyond the slide assemblies 50 and 52 and each terminates with an ear 132 which projects forwardly towards the first section 12 of the bus 10 and serves to pivotally connect the outer ends of the friction plate member 108 to the pivot shaft member 36. Therefore, it should be apparent that the ears 130 and 132 formed on the foot portions of the friction plate members 106 and 108 respectively, together with the struts 122 and 124 and the attached trunnion member, cooperate to connect the friction plate members 106, 108 to the pivot shaft member 36 for pivotal movement thereabout. This arrangement allows the friction plate members 106 and 108 to remain stationary with the pivot shaft member 36 as the tongue members 32 and 34 move relative thereto when the bus 10 is in a turn, and also allow the friction plate members 106 and 108 to move together with the tongue members 32 and 34, respectively, about the pivot shaft member 36 when the bus 10 travels over crests and valleys in a road surface.

Each brake caliper 110 and 112 is of conventional construction having the usual opposed brake pads (not shown) one of which is movable through an actuator such as an air cylinder (not shown) and cooperates with the other brake pad for applying a clamping force to the flat upper and lower surfaces of the associated friction plate member for resisting relative movement of the front and rear sections 12 and 14 about the vertical center axes of the pivot pins 66 and 89. Thus, when actuated, the brake calipers 110 and 112 mounted on the beam members 54 and 56 of tongue member 32 serve to resist or dampen movement of the front section 12 about the pivot pin 66, while the corresponding brake calipers 110 and 112 mounted on the beam members 72 and 74 of tongue member 34 serve to resist or dampen movement of the rear section 14 about the pivot pin 84.

In the present invention, damping at the hinge connection 16, as provided by the friction device 17, is varied in accordance with the speed of the bus 10 after the bus 10 attains a predetermined speed. In addition, as aforementioned, the damping or resistance to relative movement of the sections 12 and 14 about the pivot pins 66 and 84 is varied so that initially only minimum damping is provided after the bus 10 attains a predetermined speed and afterwards the damping is increased when the bus 10 attains predetermined higher speeds.

In this regard and as seen in FIG. 1, the electric circuit 19, which forms a part of the invention, includes a magnetic pickup 133 for continually sensing the RPM of the front wheel 22 and providing a signal to the electronic speed switch 114. The speed switch 114, is designed to provide multiple output signals at selected speeds of the vehicle as sensed by the pickup 133 and has adjustable levels of speed that can be set by the user. A speed switch of this type is manufactured by Dynalco Corporation, 5200 N.W. 37th Ave., P. O. Box 8187, Fort Lauderdale, Fla. and identified as model SS2400-39, and in this instance, it can be assumed that the speed switch 114 is set to provide three output signals corresponding to bus speeds of 30 m.p.h., 40 m.p.h., and 50 m.p.h. Therefore, when the bus 10 attains a speed of 30 m.p.h., the speed switch 114 will generate an output signal via conductor 134 which will cause a normally-closed solenoid valve 135 to open. As a result, the source of pressurized air 136, which is at a pressure of 130 p.s.i. for example, is connected to the air-operated actuators of both pairs of calipers 110 and 112 via air line 138, a pressure regulator valve 140, pressure reducer 142, solenoid valve 135, check valves 144 and 146, and air lines 148, 150, and 152 so that a first or low level of clamping force or damping is provided at the hinge connection 16. In order to realize a low level of damping the pressure regulator valve 140 is set at an intermediate pressure such as 60 p.s.i. while the pressure reducer 142 is set at 25 p.s.i. Accordingly, when the solenoid valve 134 is opened, the air-operated actuators of both pair of calipers 110 and 112 are supplied with compressed air at a pressure of 25 p.s.i. to provide the first or low level of damping at the hinge connection 16.

As the speed of the bus 10 increases to the second predetermined speed of 40 m.p.h., the speed switch 114 will provide an output signal via conductor 154 which will cause normally-closed solenoid valve 156 to open. As a result, the source of pressurized air 136 is connected to both pair of calipers 110 and 112 via air line 138, pressure regulator valve 140, solenoid valve 156, check valves 158 and 146, and air lines 148, 150 and 152. Accordingly, the air-operated actuators of calipers 110 and 112 are supplied with compressed air at a pressure of 60 p.s.i. and provide an increased level of damping or clamping force on the friction plate members 106 and 108 located at the hinge connection 16.

Finally, when the bus 10 reaches the third predetermined speed of 50 m.p.h., the speed switch 114 will provide an output signal via conductor 160 which will cause normally-closed solenoid valve 162 to open and thereby directly connect the source of pressurized air 136 to the air-operated actuators of both pair of calipers 110 and 112 via air line 138, solenoid valve 162, check valve 164, and air lines 148, 150, and 152. As a result, the air-operated actuators of calipers 110 and 112 will be supplied with compressed air at full line pressure or 130 p.s.i. and provide maximum clamping force or damping at the hinge connection 16. It will be noted, however, that even with maximum clamping force being applied by the calipers 110 and 112 to the friction plate members 106 and 108 be design, a lock-up of the two sections 12 and 14 will not occur. In other words, the brake calipers 110 and 112 are of a size and design that even at a maximum pressure of 130 p.s.i., the two sections 12 and 14 can be angularly displaced relative to each other about the pivot pins 66 and 84, if necessary.

Various changes and modifications can be made in this construction without departing from the spirit of the invention. Such changes and modifications are contemplated by the inventors and they do not wish to be limited except by the scope of the appended claims.

The embodiments of the invention for which an exclusive property or privilege is claimed are defined as follows:

1. In an articulated vehicle having a front section and a rear section interconnected by a hinge connection which allows relative angular displacement of said front and rear sections about a vertical axis, a damping system located at said hinge connection for resisting road induced relative movements of said front and rear sections about said vertical axis, after said vehicle attains a first predetermined speed, said damping system including a friction device located at said hinge connection, said friction device comprising a friction plate member and fluid-operated brake means for applying a clamping force to said friction plate member when supplied with pressurized fluid, first means for supplying pressurized fluid to said brake means at a predetermined pressure so as to cause said friction device to provide a first level of resistance to said relative movements, second means for supplying pressurized fluid to said brake means at a pressure higher than said predetermined pressure so as to cause said friction device to provide a second level of resistance to said relative movements, said second level of resistance being greater than said first level of resistance, and an electronic control circuit including means for sensing the speed of said articulated vehicle and for automatically actuating said first means when said articulated vehicle attains said predetermined speed and for actuating said second means when said articulated vehicle attains a second predetermined speed which is greater than said first predetermined speed so that said damping system increases its resistance to said road induced relative movements of said front and rear sections in accordance with an increase in the speed of said articulated vehicle.

2. In an articulated vehicle having a front section and a rear section interconnected by a hinge connection which allows relative angular displacement of said front and rear sections about a vertical axis, a damping system located at said hinge connection for resisting road induced relative movements of said front and rear sections about said vertical axis after said vehicle attains a first predetermined speed, said damping system including a friction device located at said hinge connection, said friction device comprising a friction plate member and air-operated caliper brake means mounted on one of said sections for applying a clamping force to said friction plate member when supplied with pressurized air, first means including a first normally-closed solenoid valve for supplying pressurized air to said caliper brake means at a first predetermined pressure so as to cause said friction device to provide a first level of resistance to said relative movements, second means including a second normally-closed solenoid valve for supplying pressurized air to said brake caliper means at a pressure higher than said predetermined pressure so as to cause said friction device to provide a second level of resistance to said relative movements, said second level of resistance being greater than said first level of resistance, and an electronic control circuit including means for sensing the speed of said articulated vehicle and for automatically causing said first normally-closed solenoid valve to open when said articulated vehicle attains said first predetermined speed and for causing said second normally-closed solenoid valve to open when said articulated vehicle attains a second predetermined speed which is greater than said first predetermined speed so that said damping system increases the resistance to said road induced relative movements of said front and rear sections at said hinge connection in accordance with an increase in the speed of said articulated vehicle.

* * * * *